United States Patent
Solovyeva et al.

(10) Patent No.: US 12,421,447 B2
(45) Date of Patent: Sep. 23, 2025

(54) FLUORESCENT METAL ORGANIC FRAMEWORKS (MOFS) FOR DRILLING DEPTH CORRELATION AND WATERFRONT MAPPING

(71) Applicant: SAUDI ARABIAN OIL COMPANY, Dhahran (SA)

(72) Inventors: Vera Solovyeva, Moscow (RU); Nouf Mohammed Al-Jabri, Dammam (SA); Alberto F. Marsala, Venice (IT)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/043,834

(22) PCT Filed: Jun. 9, 2022

(86) PCT No.: PCT/RU2022/000188
§ 371 (c)(1),
(2) Date: Mar. 2, 2023

(87) PCT Pub. No.: WO2023/239252
PCT Pub. Date: Dec. 14, 2023

(65) Prior Publication Data
US 2024/0294824 A1    Sep. 5, 2024

(51) Int. Cl.
*C09K 8/86* (2006.01)
*C09K 11/06* (2006.01)
(Continued)

(52) U.S. Cl.
CPC ............... *C09K 8/86* (2013.01); *C09K 11/06* (2013.01); *E21B 47/04* (2013.01); *E21B 47/11* (2020.05);
(Continued)

(58) Field of Classification Search
CPC ..................................................... E21B 43/26
See application file for complete search history.

(56) References Cited

U.S. PATENT DOCUMENTS

| | | |
|---|---|---|
| 10,961,445 B2 | 3/2021 | Ogle et al. |
| 11,007,516 B1 | 5/2021 | Sava Gallis et al. |
| | (Continued) | |

FOREIGN PATENT DOCUMENTS

| | | |
|---|---|---|
| CA | 2699496 A1 | 6/2009 |
| CN | 108872165 A | 11/2018 |
| | (Continued) | |

OTHER PUBLICATIONS

Chen, et al., "Smart Integration of Carbon Quantum Dots in Metal-Organic Frameworks for Fluorescence-functionalized Phase Change Materials," Energy Storage Materials, Aug. 19, 2018, 21 pages.
(Continued)

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A composition that includes a fluorescent metal-organic framework (MOF) and a drilling fluid is provided. The MOF includes a porous, crystalline structure and a fluorescent source. A method includes introducing a MOF into a drilling fluid and circulating the drilling fluid through a well during a drilling operation that creates formation cuttings such that the fluorescent MOF interacts with the formation cuttings, creating tagged cuttings. The method further includes collecting returned cuttings from the circulating drilling fluid at a surface of the well, detecting the presence of the fluorescent MOF on the returned cuttings to identify the tagged
(Continued)

cuttings, and correlating the tagged cuttings with a drill depth in the well at a time during the drilling operation.

11 Claims, 2 Drawing Sheets

(51) Int. Cl.
 *E21B 47/04* (2012.01)
 *E21B 47/11* (2012.01)
 *E21B 49/00* (2006.01)
(52) U.S. Cl.
 CPC ........ *E21B 49/005* (2013.01); *C09K 2208/10* (2013.01); *C09K 2211/18* (2013.01)

(56) References Cited

U.S. PATENT DOCUMENTS

| | | | |
|---|---|---|---|
| 2017/0350225 A1 | 12/2017 | Benoit et al. | |
| 2018/0346500 A1 | 12/2018 | Horcajada-Cortes et al. | |
| 2020/0283678 A1* | 9/2020 | Ogle | C09K 8/92 |
| 2022/0120168 A1 | 4/2022 | Katterbauer et al. | |

FOREIGN PATENT DOCUMENTS

| | | |
|---|---|---|
| EP | 2193136 B1 | 7/2014 |
| RU | 2323457 C2 | 4/2008 |

OTHER PUBLICATIONS

De Jong, et al., "Fluorescent metal organic frameworks for the visual enhancement of latent fingermarks," Forensic Science International, 291, 12-16. Jul. 30, 2018, 10 pages.

Fang, et al., "Structure, Luminescence, and Adsorption Properties of Two Chiral Microporous Metal-Organic Frameworks.," Inorganic Chemistry, 45(9), 3582-3587, Oct. 20, 2005, 6 pages.

Pamei, et al., "Luminescent transition metal-organic frameworks: An emerging sensor for detecting biologically essential metal ions," Nano-Structures & Nano-Objects, 19, 100364, Jul. 6, 2019, 23 pages.

Saraci, et al., "Rare-earth metal-organic frameworks: from structure to applications," Chemical Society Reviews, Mar. 28, 2020, 29 pages.

Sun et al., Recent Advances in Developing Lanthanide Metal-Organice Frameworks for Rationmetric Fluorescent Sensing, Frontiers in Chemistry, Jan. 25, 2021, 7 pages.

Tang et al., "A highly fluorescent metal organic framework probe for 2,4,6-trinitrophenol detection via post-synthetic modification of UIO-66-NH2," Dyes and Pigments, Mar. 22, 2019, 15 pages.

Xiong et al., A highly fluorescent lanthanide metal-organic framework as dual-mode visual sensor for berberine hydrochloride and tetracycline. Analytical Bioanalytical Chemistry, 411, 5963-5973, Jun. 27, 2019, 11 pages.

Zhu et al., "Fluorescent Metal-Organic Framework (MOF) as a Highly Sensitive and Quickly Responsive Chemical Sensor for the Detection of Antibiotics in Simulated Wastewater," Inorganic Chemistry, 57(3), 1060-1065, Sep. 26, 2017, 6 pages.

International Search Report and Written Opinion issued in Corresponding Application No. PCT/RU2022/000188, Mailed Mar. 2, 2023, 9 pages.

* cited by examiner

FLUORESCENT METAL ORGANIC FRAMEWORKS (MOFS) FOR DRILLING DEPTH CORRELATION AND WATERFRONT MAPPING

BACKGROUND

Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole. Drill cuttings, also referred to as "rock cuttings" or "formation cuttings" are rock fragments generated by the drill bit as the drill bit advances along the borehole. Mud logging is the creation of a well log of a borehole by examining the rock cuttings brought to the surface by the circulating drilling mud.

A taggant or "tag" is a chemical or physical marker added to materials to allow various forms of testing of the marked materials. The taggant can be detected using a taggant detector. A physical taggant can take many different forms but is typically microscopic in size, added to the materials at low levels, and simple to detect. The taggant may be encoded based on a specific characteristic (e.g., optical, chemical, electrical, or mechanical characteristic) to act as a virtual "fingerprint." Examples of encoded taggant include microscopic, metallic tags, e.g., between 0.3 and 1.0 millimeters, that have unique multi-digit alphanumeric identification codes. For example, the identification code may be etched into an optically variable (holographic) substrate of the tag. The tags may be suspended in a UV sensitive clear adhesive which is either brushed or sprayed onto any item for authentication or other security purposes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition that includes a fluorescent metal-organic framework (MOF) and a drilling fluid.

In another aspect, embodiments herein relate to a method that includes introducing a MOF into a drilling fluid. The drilling fluid may then be circulated through a well during a drilling operation that creates formation cuttings such that the fluorescent MOF interacts with the formation cuttings, creating tagged cuttings. The method further includes collecting returned cuttings from the circulating drilling fluid at a surface of the well and detecting the presence of the fluorescent MOF on the returned cuttings to identify the tagged cuttings. The identified tagged cuttings may be correlated with a drill depth in the well at a time during the drilling operation.

Other aspects and advantages of the claimed subject matter will be apparent from the following description and the appended claims.

DETAILED DESCRIPTION

Figure 1:
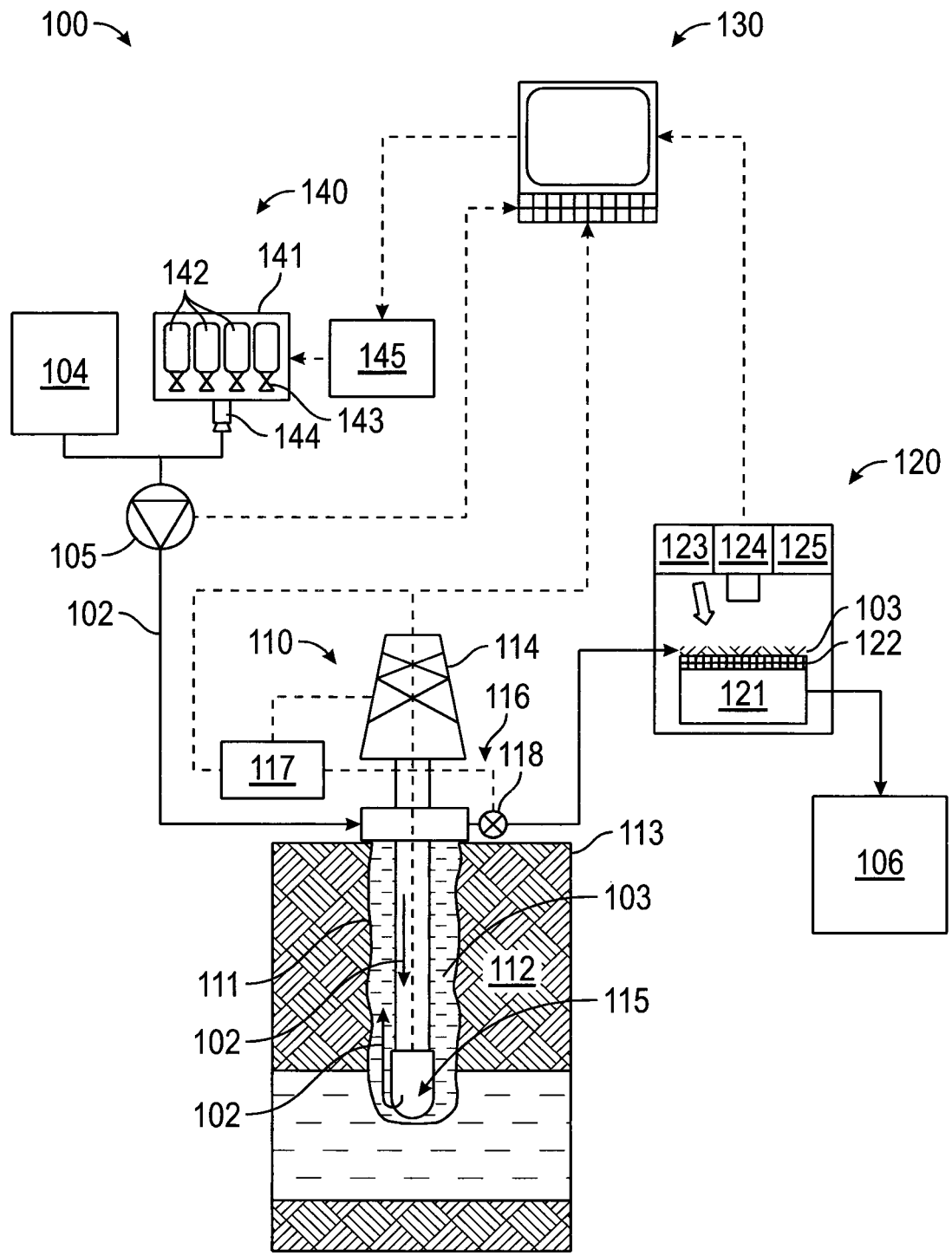
FIG. 1 shows a system according to embodiments of the present disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein generally relate to a composition that includes a fluorescent metal-organic framework (MOF) and a drilling fluid. The MOF comprises a porous, crystalline structure and a fluorescent source that may be incorporated into or exists as a part of the MOF's extended network. The fluorescent may, in some instances, be otherwise attached to the MOFs framework.

Methods of using the composition to determine drill depth of formation cuttings are also described. Fluorescent MOFs in accordance with one or more embodiments may be injected into the drilling fluid during drilling operations and travel downhole. Disclosed fluorescent MOFs may interact with the formation downhole and in some instances, attach to drill cuttings produced during the drilling process. As such, drill cuttings may be "tagged" with the fluorescent MOFs described herein. Fluorescent MOF tags having different wavelengths of fluorescent emissions, i.e., tags emitting different colors, may be controllably introduced at different drill depths. When tagged cuttings are returned to the surface via circulating drilling fluid, they can primarily be identified based upon the fluorescence emission from the tag. This fluorescence may be correlated to an associated drilling depth, and the cuttings may be identified by the depth at which they originated. Thus, disclosed compositions may be useful for determining the drilling depth of various drill cuttings.

Further, fluorescent MOF tags having different emission wavelengths may also have different powder x-ray diffraction (PXRD) patterns and molecular weight fragmentation patterns. Metal organic frameworks (MOFs) are inorganic and organic hybrid polymer coordinated compounds constructed by linking metal ions or clusters with organic ligands, providing a porous, yet rigid crystalline structure. The crystal structure is tunable via the selection of organic linkers in the metal organic framework. Therefore, the crystal structure of a MOF's unit cell and the molecular weight of its organic linkers may be used as additional identification parameters, providing a complex identification matrix for these fluorescent tags.

Drilling System

FIG. 1 shows a schematic diagram of a system 100 in which the compositions and methods disclosed herein may be used in accordance with one or more embodiments of the present disclosure. In one or more embodiments, one or more of the modules and/or elements shown in FIG. 1 may be omitted, repeated, and/or substituted. As shown in FIG. 1, the system 100 may include a well system 110, a cuttings return and detection system 120, an analysis and control system 130, and a drilling fluid tagging system 140, which may be directly and indirectly in communication with each other.

The well system 110 may include a well 111 being drilled through a subsurface formation ("formation") 112 to a hydrocarbon-bearing layer of the formation beneath the earth's surface ("surface") 113. The formation 112 may include different layers of rock having varying characteristics, such as varying degrees of permeability, porosity, capillary pressure, and resistivity. In the case of the well system 110 being operated as a production well, the well system 110 may facilitate the extraction of hydrocarbons (or "production") from the hydrocarbon-bearing layer of the formation 112. As the well 111 is drilled through the formation 112, portions of the well may be cased with a casing (extending from the surface of the well) or a liner (extending downhole from an end of a previously installed casing or liner) to line the wellbore wall. The terms "open hole," "borehole," and "wellbore" may be used interchangeably and refer to an uncased portion of a well.

In some embodiments, the well system 110 may include a rig 114 positioned above an opening to the well 111, a well sub-surface system 115, a well surface system 116, and a well control system 117. The well control system 117 may control various operations of the well system 110, such as well production operations, well drilling operations, well completion operations, well maintenance operations, and reservoir monitoring, assessment and development operations. In some embodiments, the well control system 117 may include a computer system that is the same as or similar to that of the analysis and control system 130, described below in more detail.

The rig 114 may hold equipment used to drill a borehole to form the well 111. Major components of the rig 114 may include drilling fluid tanks, drilling fluid pumps (e.g., rig mixing pumps), a derrick or mast, drawworks, a rotary table or top drive, drill string, power generation equipment and auxiliary equipment.

The well 111 may include a borehole that extends from the surface 113 into the formation 112. An upper end of the well 111, terminating at the surface 113, may be referred to as the "up-hole" end of the well 111, and a lower end of the well, terminating in the formation 112, may be referred to as the "downhole" end of the well 111.

In some embodiments, during operation of the well system 110, the well control system 117 may collect and record well data (e.g., from monitoring devices (e.g., logging tools) lowered into the well during monitoring operations (e.g., during in situ logging operations, or from drilling operations) for the well system 110. For example, during drilling operations of the well 111, the well data may include mud properties, flow rates, drill volume and penetration rates, formation characteristics, etc. In some embodiments, the well data may be recorded in real-time, and are available for review or use within seconds, minutes or hours of the condition being sensed (e.g., the measurements are available within 1 hour of the condition being sensed). In such embodiments, the well data may be referred to as "real-time" well data. Real-time well data may enable an operator of the well 111 to assess a relatively current state of the well system 110, and make real-time decisions regarding development of the well system 110 and the reservoir, such as on-demand adjustments in drilling fluid and regulation of production flow from the well.

In some embodiments, the well surface system 116 may include a wellhead installed at the "up-hole" end of the well, at or near where the well terminates at the surface 113, where the wellhead may include a rigid structure for supporting (or "hanging") casing and production tubing extending into the well 111. Drilling fluid directed from the well to the surface may flow through the wellhead, after exiting the well 111 and the well sub-surface system 115, including, for example, casing, production tubing, a drill string, and a bottom hole assembly (including a drill bit). Such fluid may carry the disclosed fluorescent MOFs downhole, as will be explained in greater detail below. In some embodiments, the well surface system 116 may include flow regulating devices that are operable to control the flow of substances into and out of the well 111. For example, the well surface system 116 may include one or more valves 118 that are operable to control the flow of fluid from the well 111. For example, a valve 118 may be fully opened to enable unrestricted flow of returning drilling from the well 111, the valve 118 may be partially opened to partially restrict (or "throttle") the flow of fluid from the well 111, and the valve 118 may be fully closed to fully restrict (or "block") the flow of fluid from the well 111, and through the well surface system 116.

In some embodiments, the well surface system 116 may include surface sensors for sensing characteristics of fluids passing through or otherwise located in the well surface system 116, such as pressure, temperature and flow rate of fluid flowing through the wellhead, or other conduits of the well surface system 116, after exiting the well 111. Surface sensors may also include sensors for sensing characteristics of the rig 114 and drilling equipment, such as bit depth, hole depth, hook load, rotary speed, weight on bit, etc.

In a drilling operation, drilling fluid 102 may be pumped from a drilling fluid source 104, which may be, for example, supplied through trucks or tanks, where the drilling fluid source 104 may include a premixed drilling fluid or components provided separately that are mixed on site. In some embodiments, the drilling fluid source 104 may include used drilling fluid from a mud pit 106, which includes drilling fluid that was circulated through the well, returned to the surface and cleaned. In accordance with one or more embodiments of the present disclosure, a fluorescent MOF may be pumped downhole with the drilling fluid 102 and circulated through the well 111 to tag cuttings as they are formed from drilling.

Fluorescent MOFs may be supplied from a tag injection assembly 141 in the tagging system 140. The tag injection assembly 141 may include a plurality of tag chambers 142, each tag chamber 142 holding a different tag and having a valve 143 positioned at a chamber outlet. A metering pump 144 may be in fluid communication with the chamber outlets of the tag chambers 142, such that when tags are released from a tag chamber 142 through the associated valve 143, the tags may be metered into the drilling fluid 102. For example, as drilling fluid 102 is pumped from the drilling fluid source 104 to the well 111, a selected tag may be released from a tag chamber 142 and metered at a selected rate through the metering pump 144 to mix with and flow with the drilling fluid 102 into the well 111.

The valves 143 and metering pump 144 may be operated and controlled using a controller 145. The controller 145 may be integrated with the tag injection assembly 141 or may be remote from the tag injection assembly 141. The controller 145 may send commands to the valves 143 (e.g., to open or close the valve) and the metering pump 144 (e.g., to control the speed at which the tags are metered through the pump). The controller 145 may also receive signals from the valves 143 and metering pump, for example, signals relaying status of operation. The controller 145 may send commands to implement one or more jobs designed by the analysis and control system 130. For example, the analysis and control system 130 may determine an optimized tag release operation and send instructions to the controller 145 for implementing the optimized tag release operation. The controller 145 may then send commands to one or more valves 143 and the metering pump 144 to release tags from one or more tag chambers 142 at a given speed and on a schedule according to the optimized tag release operation.

One or more pumps 105 may be used to pump the mixed tags and drilling fluid into the well 111 as the well is drilled. The drilling fluid 102 and tags may be pumped through a drill string extending through the well and out of a bottom hole assembly (e.g., through a drill bit) at an end of the drill string. When the tags are ejected out of the bottom of the drill string with the drilling fluid, the tags may attach to the formation being drilled. In one or more embodiments, the drill bit may press the tags into the formation, which may cause the tags to stick to or stain parts of the formation that then become cuttings. In some embodiments, hydraulic circulation may be the main driving force for attachment of the tags to the formation, however, the detailed interaction mechanism between the tags and formation depends on the type of tag used and may vary (e.g., chemical interaction, physical attachment, sorption, and/or electrostatic interactions). As the formation is drilled, cuttings 103 from the formation having the attached tags may be sent to the surface of the well and analyzed in the cuttings return and detection system 120.

When the drilling fluid 102 and tagged cuttings 103 are pumped to the surface of the well 111 during a drilling operation, the returned drilling fluid may be directed via one or more conduits (e.g., piping) to one or more separators 121 (sometimes referred to in the industry as mud shakers) in the cuttings return and detection system 120. In some embodiments, returned cuttings may automatically be directed to one or more separators 121 based on commands received from the well control system 117. A separator 121 may include, for example, one or more screens 122 arranged in the flow path of the returned drilling fluid to catch and separate cuttings 103 from the drilling fluid. For example, a separator 121 may have a screen 122 positioned laterally at an upper end of the separator 121, where returned drilling fluid may be flowed over the screen 122 after returning from the well 111. As the returned drilling fluid 102 is flowed over the screen 122, cuttings 103 in the returned drilling fluid 102 may be caught by the screen 122, while the drilling fluid 102 flows through the screen openings. In such manner, cuttings 103 brought up from drilling the well 111 may be captured and held by a screen 122 in a separator 121. In some embodiments, more than one screen and/or more than one separator may be used to separate cuttings from returned drilling fluid. In some embodiments, one or more conveyors may convey screens and/or cuttings along a path, e.g., to move cuttings to a different location for analysis.

A detection system 120 including one or more UV light sources 123 and a detection apparatus may be used to detect the presence of tags on the drill cuttings. In the embodiment shown in FIG. 1, the detection apparatus is exemplified by a camera 124. In some embodiments, the UV light source 123 may be provided around the separator 121 in a position to illuminate the cuttings 103 with UV light, and the camera 124 may be positioned above the separator 121 and positioned to take pictures of the cuttings 103 when they are illuminated by the UV light. For example, as shown in FIG. 1, a UV light source 123 and a camera 124 may be held a distance above the top screen 122 of a separator 121 and positioned to face the screen 122. The UV light source 123 and the camera 124 may be positioned adjacent or proximate to each other, such that when the UV light source 123 illuminates cuttings 103 with UV light, the camera 124 may be in a position to take images of the illuminated cuttings 103. In some embodiments, the camera 124, UV light source 123, and separator 121 may be integrated into one equipment unit. In some embodiments, one or more conveyors may be used to convey the captured cuttings 103 a distance from the separator 121 to a separate detection system having at least one UV light source and a camera.

Depending on the return fluid flow rate and amount of cuttings being returned in a drilling operation, separated and captured cuttings may be moved through the separator 121 relatively quickly to allow for a continuous separation operation. To aid in a continuous separation operation, the UV light source 123 may continuously direct UV light towards the collection of cuttings, thereby continuously illuminating the cuttings, and the camera 124 may be controlled to take images of the illuminated cuttings at a rate commensurate with the speed of cutting separation and removal. In some embodiments, the UV light source 123 may be controlled to operate in coordination with the camera 124, such that operation of the UV light source 123 is timed to illuminate the collection of cuttings immediately before and during taking an image of the cuttings with the camera 124, and where the coordinated operation of both the UV light source 123 and camera 124 may be at a rate commensurate with the speed of cutting separation and removal. The camera 124 may be controlled by a timer and/or using a software program to take images at a time when the UV light source is on. For example, a camera 124 may be controlled to take a picture at an interval (e.g., every 5 minutes, every 10 minutes, or at an interval that is tied to a flow rate of returning drilling fluid measured along a flow path between the well 111 and the separator 121), while the UV light source 123 may be controlled to continuously illuminate the separated cuttings or to illuminate the separated cuttings along the same picture taking interval as the camera 124.

In embodiments in which a camera is used as the detection apparatus, an image processing system 125 may be used to analyze images taken by the camera 124 and identify a percentage of tagged cuttings 103 (cuttings that are illuminated an identified color under the UV light) from the total captured cuttings 103 in the image. The image processing system 125 may be provided as part of the detection system 120, for example, where the camera 124 includes software instructions to perform image analysis of the pictures it takes to identify tagged cuttings 103.

The detection data, including an identified amount of at least one tag color, may then be sent to the analysis and control system 130, as discussed in more detail below. In some embodiments, the image processing system 125 may be provided as part of the analysis and control system 130, where a camera 124 may send images of captured cuttings 103 to the image processing system in the analysis and control system to be processed and identify tagged cuttings 103. An image processing system 125 may analyze images in real-time, as each image is taken. For example, in some embodiments, an image processing system 125 may analyze a first image taken by a camera 124 and identify a percentage of cuttings tagged with one or more tag colors before the camera 124 takes a second image.

Any available image processing software may be used to process images taken by the camera 124 and identify an amount of at least one tag color in each image. In some embodiments, image processing software may include instructions to divide an image into discrete uniformly sized units (e.g., pixels) and compare the color in each unit. A ratio may be calculated of the different colored units, which may be used to calculate a percentage of cuttings tagged with a selected tag color (which may be captured in the image while the cuttings are illuminated by the UV light) out of the total amount of cuttings detected in the image. The drilling depth at which the formation cuttings were generated may then be determined based on the colors identified in the collected images.

In one or more embodiments, fluorescent MOFs may be extracted from returned cuttings for further identification. Extraction of fluorescent MOFs from returned cuttings may be conducted using various methods known to a person with skill in the art, including dispersion, sedimentation, decantation and filtration, centrifugation, and solvothermal extraction. Due to the ordered, rigid structure of MOFs, the fluorescent MOF tags may also be identified by their crystal structure using powder x-ray diffraction (PXRD). In some embodiments, the PXRD pattern of a MOF may be used as the only identification technique. In other embodiments, PXRD may be used in combination with UV detection to identify MOF tags. For example, after obtaining an emission wavelength according to the method described above in real time, a crystal structure of the fluorescent MOF may be obtained by PXRD in a laboratory. MOFs with different crystal structures will provide different PXRD patterns.

In addition to the fluorescence emission wavelength and PXRD pattern, the molecular weight fragmentation pattern of the fluorescent MOFs may be obtained and used for identification. Various organic ligands may be used in MOF construction, providing an additional parameter for identification. The molecular weight of the organic ligands may be obtained from the molecular weight fragmentation pattern obtained using gas chromatography-mass spectrometry (GC-MS). Additionally, liquid chromatography-mass spectrometry (LC-MS) may be used for the determination of the molecular weight of organic ligands that compose the MOFs. Thus, a complex identification matrix relying on emission wavelength, PXRD pattern, and building block molecular weight may be used to identify individual fluorescent MOF tags. Using such an identification matrix may increase the accuracy of tagged cuttings identification.

Fluorescent MOF Composition

As previously described, the present disclosure relates to a composition useful for determining the drilling depth of cuttings formed during a drilling process. Compositions in accordance with one or more embodiments of the present disclosure include a fluorescent MOF. MOFs are porous crystalline materials comprised of metal ions or clusters of metal ions connected by organic "linker" molecules. Herein, the terms "linker" and "ligand" are used interchangeably, referring to the organic molecules that, along with metal ions or clusters, make up the extended network of a MOF. Various approaches may be used to introduce fluorescence into a MOF such as using fluorescent building blocks to create the framework of a MOF, covalently bonding a fluorescent moiety to the pores and/or channels of a non-fluorescent MOF framework and intercalating a fluorophore into pores of the MOF. Each method may be used to provide fluorescent MOFs in the present disclosure.

Fluorescence refers to a form of luminescence that may emit light when ultraviolet light or other electromagnetic radiation is absorbed. For example, when ultraviolet light is absorbed by a fluorescent compound (also referred to as a fluorophore), the fluorescent compound may emit visible light, which may be referred to as fluorescent light. Thus, as used herein, a fluorophore is a compound that emits visible light when it absorbs electromagnetic radiation. Suitable fluorophores are those that emit fluorescence at a known wavelength on the spectrum of visible light (i.e., from about 400 to about 700 nanometers) and are stable under formation conditions. As may be appreciated by those skilled in the art, fluorophores having different wavelengths of emission may be chosen to distinguish different fluorophores.

As described above, MOFs are organic-inorganic hybrid crystalline porous materials, comprising a metal ion or a cluster of metal ions and organic linkers. Because of their porous structure, MOFs may be used for a variety of applications, and the framework of a MOF may be tuned for the specific application. For example, by adjusting the organic linker geometry and other characteristics, a MOFs size, shape, and internal surface may be selected for according to its desired use. Common organic linkers used in MOFs include terephthalic acid (1,2-benzenedicarboxylic acid), trimesic acid (benzene-1,3,5-tricarboxylic acid), and 2-methylimidazole. Likewise, metal ions may be selected for based on the number of open binding sites, providing an opportunity to control MOF topology. Metal ions commonly used in MOFs include $Zn^{2+}$, $Co^{2+}$, $Cu^{2+}$, $Fe^{3+}$ and $Zr^{4+}$. Accordingly, fluorescent MOFs of the present disclosure may be designed so as to have a specific topology, along with other properties that may be tuned by the choice of metal ions and/or organic linkers.

In one or more embodiments, the fluorescent MOF comprises fluorescent building blocks, such as fluorescent metal clusters and/or fluorescent organic linkers. In such embodiments, fluorescent moieties are incorporated into the interlocked extended network of the MOF. Restricted rotation and spacing of the fluorescent building blocks may prevent aggregation-induced fluorescence quenching that is common in highly planar aromatic luminescent materials.

In embodiments in which the fluorescent MOF includes a fluorescent metal ion or cluster, examples of the fluorescent metal ion or cluster may include, but are not limited to, ions or clusters of rare-earth elements/lanthanides, actinides, and transition metals. Examples of rare-earth element ions and clusters include $Eu^{3+}$, $Sc^{3+}$, $Y^{3+}$, $Sm^{3+}$, $Pm^{3+}$, $Nd^{3+}$, $Pr^{3+}$, $Tm^{3+}$, $Er^{3+}$, $Dy^{3+}$, and combinations thereof. Transition metals that may be incorporated into the MOF extended network as metal ions or clusters include $Zn^{2+}$, $Zr^{4+}$, $Co^{3+}$, $Ni^{2+}$, $Cr^{3+}$, $Nb^{5+}$, $Cu^{2+}$, $Cu^{1+}$, $Fe^{2+}$, $Fe^{3+}$, $Ti^{4+}$, $Al^{2+}$, and combinations thereof. Suitable actinides that may be included in a fluorescent MOF in the form of ions or clusters include $Am^{4+}$, $U^{4+}$, $Am^{3+}$, $Np^{4+}$, and $Np^{3+}$, among others.

Alternatively, embodiment fluorescent MOFs may comprise fluorescent organic linkers. Examples of fluorescent linkers include, but are not limited to 1,4-benzenedicarboxylic acid and its derivatives; 1,4- and 2,6-naphthalene dicarboxylic acids and its derivatives; biphenyl-4,4'-dicarboxylic acid and its derivatives; 1,6-anthracene dicarboxylic acid and its derivatives: 1,1',4',1"-terphenyl-2',4,4"',5'-tetracarboxylic acid (TPTC), 1,1,2,2-tetrakis(4-(pyridine-4-yl)phenyl)ethane (TPPE), trans-4,4'-stilbene dicarboxylic acid, 2,7-pyrenedicarboxylic acid and its derivatives; 1,6-pyrenedicarboxylic acid and its derivative; 1,3,6,8-pyrenetetracarboxylic acid and its derivatives; pyrene-1-carboxylic acid and its derivatives; pyrene-2-carboxylic acid and its derivatives; 8-anilino-1-naphthalenesulfonic acid and its derivatives; porphyrine mono-, di-, tri-, tetra-, and polycarboxylic acids and derivatives; phthalocyanine mono-, di-, tri-, tetra-, and polycarboxylic acids and derivatives; other organic linkers, and combinations thereof.

In one or more embodiments, the fluorescent MOF comprises a non-fluorescent MOF framework (i.e., a MOF made of non-fluorescent building blocks) that has been post-synthetically modified to include a fluorescent moiety. Several families of non-fluorescent MOFs are known in the art, each family exhibiting unique properties. Specifically, the Material de Institut Lavoisier (MIL) family, zeolitic imidazolate framework (ZIF) family, and the University of Oslo (UiO) family of MOFs may be used in aqueous and oil-based samples such as the drilling fluids of the present disclosure. Accordingly, in one or more embodiments, a fluorescent moiety may be covalently attached to non-fluorescent MOFs including, but not limited to, MOFs of the MIL family, the ZIF family, and the UiO family.

Organic molecules having a highly conjugated structure may be used as fluorescent moieties that bond to the pores of non-fluorescent MOFs. For example, aromatic, heteroaromatic, and highly unsaturated compounds may be used as fluorescent moieties. Specifically, fluorescent moieties that may be bonded to a non-fluorescent MOF include, but are not limited to, rhodamine dye derivatives, fluorescein derivatives, fluorescein isothiocyanate, uranin derivatives, eosin derivatives, BODIPY dyes derivatives, porphyrin derivatives, phthalocyanine derivatives, and combinations thereof.

As noted above, a post-synthetic modification may be used to attach a fluorescent moiety to a MOF. The post-synthetic modification (PSM) method used to attach fluorescent moieties to a MOF is not particularly limited. As will be appreciated by a person skilled in the art, there are various method of post-synthetic modification that may be used to provide fluorescent MOFs according to the present disclosure. For example, in one or more embodiments, MOFs may undergo covalent PSM, ionic PSM, dative PSM, or inorganic PSM to include fluorescent moieties. Covalent PSM may involve forming a covalent bond between a functional group included on an organic linker of a MOF and a fluorescent moiety. For example, fluorescein isothiocyanate may be reacted with a hydroxyl group of an organic linker in a MOF to covalently attach a fluorescent moiety. MOFs that undergo dative PSM may result in the coordination of a fluorescent moiety to the central metal ion or cluster of the MOF. An example of inorganic PSM is metal exchange in the MOF metal clusters, which may occur upon exposure of the MOF to a solution of a different metal salt. Ionic PSM may occur via ion exchange between a counter ion and an ionic MOF. In one or more particular embodiments, fluorescent moieties are attached to a MOF via covalent post-synthetic modification.

In one or more embodiments, the fluorescent MOF comprises at least one fluorophore that is physically adsorbed to the pores and/or channels of a non-fluorescent MOF. Due to the hybrid network of MOFs including both metal clusters and organic ligands, MOFs often exhibit strong interactions needed for adsorption of a fluorophore such as hydrophobic/hydrophilic interactions and electrostatic interactions.

In one or more embodiments, examples of types of fluorophores physically adsorbed to the MOF include fluorescent dyes, quantum dots, emissive beads, fluorescent microspheres, fluorescent polymers, lanthanide ions, metal complexes, rare earth elements and combinations thereof. Examples of fluorophores may include, but are not limited to, polymers that are covalently modified with a fluorescent dye moiety, polymers having fluorescent dyes intercalated inside the crosslinked polymer structure, fluorescent polymeric microspheres (such as FluoSpheres® and TransFluoSpheres®, for example), fluorescent glass microspheres, fluorescent glass beads, fluorescent ceramic particles, particles of fluorescent minerals, fluorescent proteins (such as green fluorescent protein, for example), fluorescent quantum dots, rare earth metal derivatives and lanthanide compounds, and fluorescent porous organic polymers. Examples of fluorescent dyes include, but are not limited to, fluorescein and Rhodamine B, among others.

MOFs intercalated with fluorophores may be designed to have a particularly porous structure so that the selected fluorophores may easily diffuse into the MOF. For example, MOFs with a hollow structure may be prepared and exposed to a dispersion of quantum dots, providing the adsorption diffusion of quantum dots of matching size into pore and channels of the MOFs.

Embodiment fluorescent MOFs may have a suitable surface functionality for attachment to drill cuttings. Fluorescent MOF tags may physically or chemically adsorb to cuttings. For example, fluorescent MOFs may diffuse into the pores of drill cuttings. Additionally, MOF tags may engage in electrostatic interactions with the charged surface of the cuttings, and thus, chemically adsorbing to the cuttings.

Downhole, the MOFs may be exposed to harsh conditions such as high temperature and low pressure. In one or more embodiments, the fluorescent MOFs may be protected from the destructive influence of the downhole environment. Thus, in accordance with one or more embodiments, the fluorescent MOFs may be incorporated into composites or protected with various materials. For example, fluorescent MOFs may be encapsulated in a glass, ceramic, or polymeric matrix to form a composite. In one or more embodiments, MOFs may be entrapped inside porous ceramics or silicas. In some embodiments, a polymer shell may be grafted over the surface of the MOF. In other embodiments, MOFs may be dispersed within a polymer matrix, such as epoxy. Still other embodiments may include soaking polymers or surfactants in a MOF solution to successfully incorporate the MOF into a polymer composite.

For example, to entrap a MOF in the pores of silica, a double solvent strategy may be used. A double-solvent strategy is based on a hydrophobic solvent and a hydrophilic solution containing MOF precursors with a volume equal to or less than the pore volume of the silica support. Using this strategy, the MOF can be selectively entrapped in the channels of the silica support. In another exemplary embodiment, MOF particles may be suspended in a volatile solvent and mixed with a solution of dissolved polymer until the two are homogeneously dispersed. This mixture may then cast into a required shape after which the solvent evaporates, resulting in a MOF within a polymer matrix.

In some embodiments, the polymeric matrix in a composite material may be made from block-co-polymers, alternated polymers, cross-linked polymers, star-shaped polymers, branched polymers, dendrimers or composites of interwoven polymeric fibers.

For example, composites may be made with polymers including, but not limited to, polyvinyl chloride (PVC), polyvinyl alcohol (PVA), polyethylene oxide (PEO), polyethylene imine (PEI), polyimides (PI), polymethacrylates (PMA), polyvinylidene difluoride, polyvinylpyrrolidone, polysulfones, polydimethylsiloxane, polyacrylonitrile, and polyamides, among others.

Fluorescent MOFs in accordance with one or more embodiments may further include magnetic particles. Examples of suitable magnetic particles include but are not limited to Co, Mn, Ni and Fe clusters. Oxides and alloys of Co, Mn, Ni and Fe may also be used. In one or more particular embodiments fluorescent MOFs include magnetic iron oxide nanoparticles, super paramagnetic iron oxide nanoparticles, or combinations thereof. Magnetic particles may be encapsulated in the pores of the MOF, similar to the fluorophore. Magnetic particles may allow for the fluorescent MOFs to be separated from drill cuttings using a magnetic field. This provides a method for optionally recycling and reusing the fluorescent MOFs.

Methods of Making Fluorescent MOFs

The present disclosure also relates to methods of making the disclosed fluorescent MOFs. As previously described, fluorescence may be introduced into a MOF by a variety of methods. Methods of preparing fluorescent MOFs may vary depending on the type of extended network used to make the MOF. For example, MOFs having fluorescent organic linkers incorporated in the framework may be prepared by reacting a suitable organic linker with a metal salt to give crystalline fluorescent MOFs. Methods for basic MOF preparation will be known to someone skilled in the art. Various examples of methods for forming MOFs according to embodiments of the present disclosure are provided below.

In one or more embodiments, methods for preparing MOFs include using fluorescent building blocks, such as fluorescent metal ions or clusters, and/or fluorescent organic linkers as described above. In such methods, the fluorescent building blocks may be added to vial comprising an acid and a solvent. The solvent may be any polar, aprotic solvent such as dimethylformamide, dimethyl sulfoxide, dichloromethane, dimethylacetamide, acetonitrile, among others. The mixture may then be heated at an elevated temperature for a sufficient period of time to form the MOF. Any suitable elevated temperature may be used, provided that it is sufficient to facilitate product formation. In one or more embodiments, the elevated temperature may range from 80 to 160° C. The period of time may be sufficient to provide a MOF product. In embodiment methods, the mixture may be heated for 48 to 96 hours.

In one or more embodiment methods, after being heated for a sufficient period of time, the mixture may be cooled slowly to promote crystallization of the MOF product. The mixture may be cooled to any suitable temperature that promotes crystallization. For example, the mixture may be cooled to a temperature below 40° C., below 35° C., below 30° C., below 25° C., or below 20° C. Cooling may be performed slowly so as to promote larger, more defined crystals with less impurities. In one or more particular embodiments, mixtures containing MOF products may be cooled at a rate ranging from 0.01 to 0.25° C./min.

The produced fluorescent MOF crystals of one or more embodiment methods may then be purified according to methods known to a person with skill in the art. Certain purification techniques, such as soaking and washing, may be performed multiple times to yield pure fluorescent MOF crystals.

In one or more embodiments, methods for preparing fluorescent MOFs include reacting a non-fluorescent MOF with a fluorescent compound in the presence of a catalyst to provide a MOF with a covalently attached fluorophore. Non-fluorescent MOFs and fluorescent moieties as previously described may be used. Suitable catalysts include those used for cross coupling reactions such as Pd, Cu, Ag, and Fe, among others.

In one or more embodiments, methods may include dispersing carbon quantum dots (CQDs) into a solution comprising non-fluorescent MOFs. The carbon quantum dots are fluorescent and thus, when adsorbed to a non-fluorescent MOF, MOFs with physically adsorbed fluorophores may be formed.

Composition of a Drilling Fluid Including Fluorescent MOFs

The fluorescent MOFs in accordance with the present disclosure may be added to a drilling fluid to provide a drilling fluid composition. The disclosed MOFs may be suitable for use in any drilling fluid.

One or more embodiments of the drilling fluid include an aqueous-base fluid. The aqueous-based fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the operation of the drilling fluid.

One or more embodiments of the drilling fluid include an oil-based fluid. The oil-based drilling fluid may also be referred to as an invert emulsion. The oil-based fluid includes an oil. The oil may be crude oil, refined oils, such as diesel and mineral oils, non-petroleum organics, and combinations thereof, that are suitable for use in a wellbore environment. In one or more embodiments, the oil used may naturally contain contaminants, such as salts, minerals, and combinations thereof, as long as the contaminants do not interfere with the operation of the drilling fluid.

In one or more embodiments, the drilling fluid may contain water in a range of from about 50 wt % to 97 wt % based on the total weight of the drilling fluid. In one or more embodiments, the embodiment drilling fluid may comprise greater than 70 wt % water based on the total weight of the drilling fluid.

In one or more embodiments, the water used for the drilling fluid may have an elevated level of salts or ions versus fresh water, such as salts or ions naturally-present in formation water, production water, seawater, and brines. In one or more embodiments, salts or ions are added to the water used to increase the level of a salt or ion in the water to effect certain properties, such as density of the drilling fluid or to mitigate the swelling of clays that come into contact with the drilling fluid. Without being bound by any theory, increasing the saturation of water by increasing the salt concentration or other organic compound concentration in the water may increase the density of the water, and thus, the drilling fluid. Suitable salts may include, but are not limited to, alkali metal halides, such as chlorides, hydroxides, or carboxylates. In one or more embodiments, salts included as part of the aqueous-based fluid may include salts that disassociate into ions of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides, and combinations thereof. Without being bound by any theory, brines may be used to create osmotic balance between the drilling fluid and portions of the subterranean formation, such as swellable clays.

In one or more embodiments, the drilling fluid may comprise one or more salts in an amount that ranges from about 1 to about 300 ppb (pounds per barrel). For example, the drilling fluid may contain the one or more salts in an amount ranging from a lower limit of any of 1, 10, 50, 80, 100, 120, 150, 180, 200, 250 and 280 ppb, to an upper limit of any of 20, 30, 40, 50, 70, 100, 120, 150, 180, 200, 220, 240, 260, 280 and 300 ppb, where any lower limit can be used in combination with any mathematically-compatible upper limit.

In one or more embodiments, the drilling fluid may include at least one pH adjuster. The pH adjuster may be at least one alkali compound. Examples of alkali compounds may include, but are not limited to, lime (calcium hydroxide, calcium oxide, or a mixture thereof), soda ash (sodium carbonate), sodium hydroxide, potassium hydroxide, and combinations thereof. The alkali compounds may react with gases, such as $CO_2$ or $H_2S$ (also known as acid gases), encountered by the drilling fluid composition during drilling operations and prevent the gases from hydrolyzing components of the drilling fluid composition. Some embodiment drilling fluid compositions may include a pH adjuster in a range of from about 0.01 wt % to about 0.7 wt %, such as from 0.01 wt % to 0.5 wt %, from 0.01 wt % to 0.3 wt %, from 0.01 wt % to 0.1 wt %, from 0.01 wt % to 0.05 wt %, from 0.05 wt % to 0.7 wt %, from 0.05 wt % to 0.5 wt %, from 0.05 wt % to 0.3 wt %, from 0.05 wt % to 0.1 wt %, from 0.1 wt % to 0.7 wt %, from 0.1 wt % to 0.5 wt %, from 0.1 wt % to 0.3 wt %, from 0.3 wt % to 0.7 wt %, from 0.3 wt % to 0.5 wt %, and from 0.5 wt % to 0.7 wt % pH adjuster, based on the total weight of the drilling fluid composition. In one or more embodiments, the drilling fluid compositions may optionally include from 0.01 ppb to 10 ppb of at least one pH adjuster based on the total volume of the drilling fluid composition.

Embodiment drilling fluids may have a neutral or alkaline pH. In one or more embodiments, the drilling fluid may have a pH ranging from about 7, 7.5, 8, 8.5, 9, 9.5, and 10, to about 7.5, 8, 8.5, 9, 9.5, 10, 10.5, and 11, where any lower limit may be combined with any mathematically feasible upper limit.

In one or more embodiments, the drilling fluid may include weighting agents, which may be dispersed in the drilling fluid. The solids may be finely divided and have a specific gravity (SG) that when added to an aqueous-based fluid increases the density of the drilling fluid. Examples of suitable weighting materials include, but are not limited to, barite (minimum SG of 4.20), hematite (minimum SG of 5.05), calcium carbonate (minimum SG of 2.7-2.8), siderite (minimum SG of 3.8), ilmenite (minimum SG of 4.6), magnesium tetroxide (minimum SG of 4.8), and combinations thereof.

The embodiment drilling fluid may include an amount of weighting material sufficient to increase the density of the drilling fluid composition to support the wellbore and prevent fluid intrusion. In one or more embodiments, the drilling fluid composition may include weighting material in a range of from about 1 wt % to about 30 wt % based on the total weight of the drilling fluid composition. For example, the drilling fluid may contain weighting agents in an amount ranging from about 1 ppb to about 700 ppb, such as from about 10 to about 650 ppb, from about 50 ppb to about 700 ppb, or from about 100 ppb to about 600 ppb, or from about 200 ppb to about 500 ppb.

In one or more embodiments, the drilling fluid may have a density in a range of from about 62 pounds cubic foot (pcf) to about 170 pcf as measured using Fann Model 140 Mud Balance according to ASTM Standard D4380. For instance, the drilling fluid may have a density in a range of from about 63 pcf to about 150 pcf, from 65 pcf to 140 pcf, from 70 pcf to 160 pcf, from 80 pcf to 150 pcf, from 90 pcf to 140 pcf, from 100 pcf to 160 pcf, from 70 pcf to 150 pcf, from 70 pcf to 100 pcf, and from 120 pcf to 160 pcf. The drilling fluid may have a density that is greater than or equal to 62 pcf, such as greater than or equal to 70 pcf, and such as greater than or equal to 100 pcf.

In one or more embodiments, the drilling fluid may include a suitable amount of the fluorescent MOFs for delivering the tags downhole to the formation. The amount of fluorescent MOFs may be adjusted depending on the type of fluorescent MOF used. In one or more embodiments, the drilling fluid may include from 0.1 to 30 wt. % (weight percent) of the fluorescent MOF relative to the total weight of the drill cuttings. For example, the drilling fluid may include the fluorescent MOF in an amount having a lower limit of one of 0.1, 0.2, 0.5, 1.0, 2.0, 2.5, 5.0, and 10 wt. % and an upper limit of one of 5.0, 10, 12, 15, 18, 20, 25, and 30 wt. %, where any lower limit may be paired with any mathematically compatible upper limit.

Method of Correlating Recovered Drill Cuttings to Drilling Depth

Figure 2:
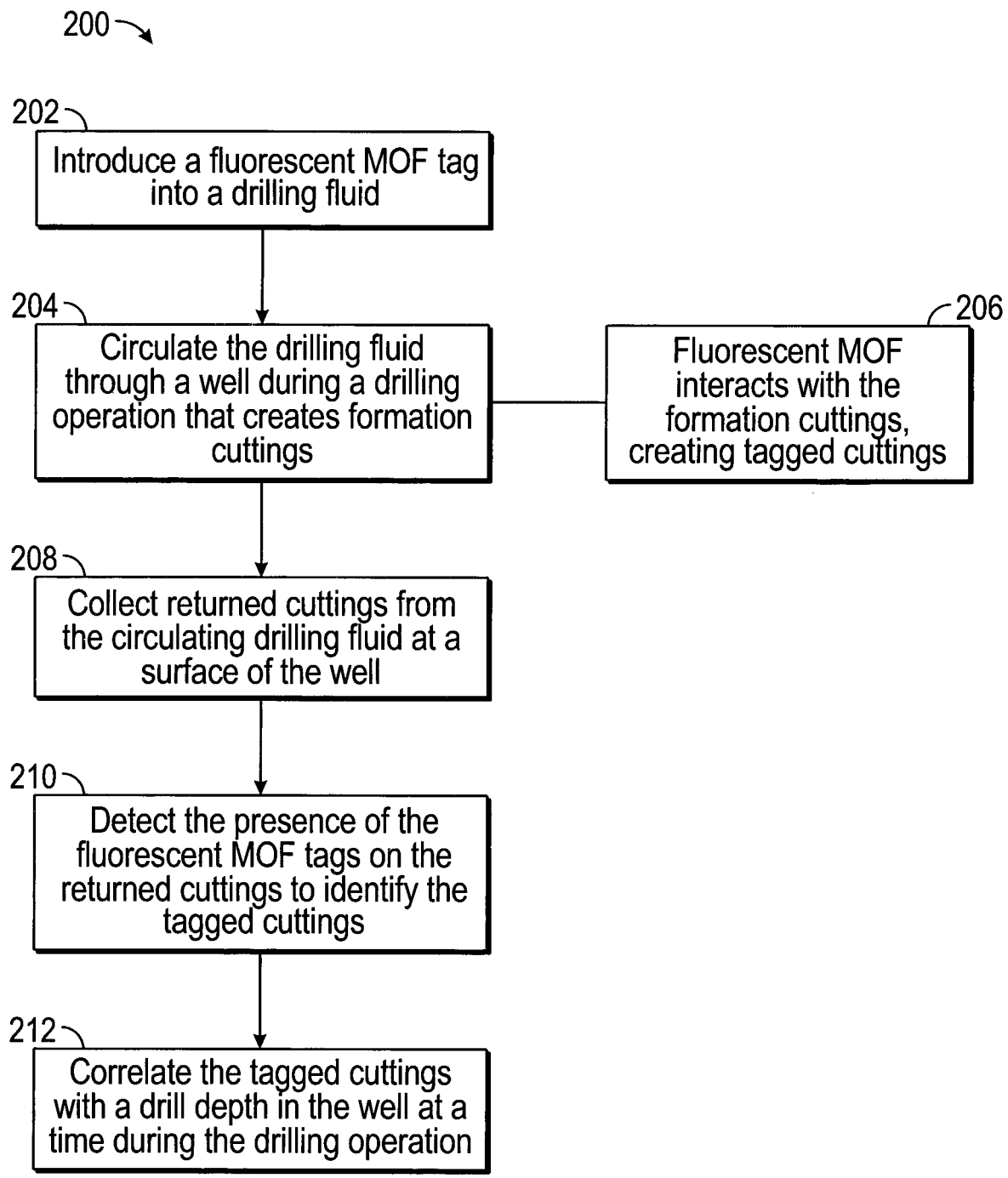
FIG. 2 is a block flow diagram of a method according to embodiments of the present disclosure.

One or more embodiments of the present disclosure relate to methods of using the disclosed fluorescent MOFs to determine the drill depth of drill cuttings. An exemplary method 200 is shown in FIG. 2. The method 200 shown in FIG. 2 includes introducing a fluorescent MOF (tag) into a drilling fluid 202. The fluorescent MOF tags may be introduced into the drilling fluid by mixing the tags with the drilling fluid prior to pumping the drilling fluid downhole (e.g., via the tagging system 140 described with reference to FIG. 1). A tag having a particular fluorescence emission wavelength may be introduced at a known drill depth.

After the tag has been introduced into the drilling fluid, the drilling fluid is circulated through a well during a drilling operation that carries formation cuttings 204. During the process of circulating the drilling fluid as formation cuttings are created, the fluorescent MOF interacts with the formation cuttings, creating tagged cuttings 206.

As drilling fluid is circulated in the well, cuttings, including tagged cuttings, are returned to the surface of the well in the circulating fluid. The method 200 includes collecting these returned cuttings from the circulating drilling fluid at a surface of the well 208. In some embodiments, the returned cuttings may be collected via the cuttings return and detection system 120 described with reference to FIG. 1.

Once returned drill cuttings are collected, the presence of the fluorescent MOF tags may be detected on the returned cuttings to identify the tagged cuttings 210. The presence of the fluorescent MOF tags may be detected by illuminating the returned cuttings with UV light and obtaining images of the cuttings with a camera. Other methods for detecting the fluorescent MOFs on the drill cuttings may be used. For example, fluorimetry, ultraviolet spectroscopy, spectrophotometry, gel permeation chromatography with light scattering detector, and X-ray fluorescence analysis (XRF) may all be suitable detection methods. Furthermore, methods of detection that are not based on the light-emission property of the MOFs may be used, such as powder x-ray diffraction, gas chromatography-mass spectrometry, liquid chromatography-mass spectrometry, nuclear magnetic resonance, and gel permeation chromatography, to detect and quantify returned tags.

The method 200 then includes correlating the tagged cuttings identified from the returned cuttings with a drill depth in the well at a time during the drilling operation 212. The correlation may be made by identifying the fluorescence of the tagged cuttings and associating the fluorescent MOF with a tag that was introduced at a given time. The time at which a particular tag was introduced may be associated with a given drill depth (e.g., based on drill pipe length, pump rate, and calculated return time).

In one or more embodiments, multiple tags may be used to determine depth of cuttings at different times during the drilling operation. In such embodiments, after the previously described steps, a second fluorescent MOF tag may be pumped with the drilling fluid down the well. The second fluorescent MOF tag may attach to and tag formation cuttings as the well is drilled. During the drilling operation, the drill cuttings are returned to the surface of the well as the drilling fluid is circulated, and the presence of the second fluorescent MOF may be detected on the tagged cuttings in the same or similar manner that previous fluorescent MOF tags were detected.

In one or more embodiments, the first fluorescent MOF tags may have a first emission wavelength, and the second fluorescent MOF tags may have a second emission wavelength. The first emission wavelength is different from the second emission wavelength such that the first fluorescent MOF may be differentiated from the second fluorescent MOF by illuminating the fluorescent MOFs with UV light and obtaining images of the cuttings with a camera. As will be appreciated by those skilled in the art, any number of different fluorescent MOFs may be used at different depths during the drilling process. The fluorescent MOFs may be chosen based on their emission wavelength such that they may be differentiated from one another using any of the aforementioned detection methods.

In further embodiments, the fluorescent MOF may have a first emission wavelength, a first powder x-ray diffraction (PXRD) pattern, and a first set of molecular weights and the second fluorescent MOF comprises a second emission wavelength, a second powder x-ray diffraction (PXRD) pattern, and a second set of molecular weights. The first emission wavelength is different from the second emission wavelength, the first PXRD pattern is different from the second PXRD pattern, and the first set of molecular weights is different from the second set molecular weights such that the first fluorescent MOF may be differentiated from the second fluorescent MOF using a three-dimensional detection matrix consisting of illuminating the fluorescent MOFs with UV light and obtaining images of the cuttings with a camera, obtaining PXRD patterns of the fluorescent MOFs, and obtaining molecular weights of the fluorescent MOFs building blocks using gas chromatography-mass spectrometry (GC-MS) or liquid chromatography-mass spectrometry (LC-MS).

As previously described, in one or more embodiments, the fluorescent MOFs may include magnetic particles. In such embodiments, disclosed methods may further include separating the fluorescent MOF from the formation cuttings using a magnetic field. The magnetically collected fluorescent MOFs may be collected and recycled for reuse. Additionally, non-magnetic samples may also be recycled and reused. In such instances, it is generally sufficient to rinse the cuttings with a small amount of organic solvent, which will remove the tags from the cuttings. The removed tags can then be collected and recycled for reuse.

Method of Waterfront Mapping with Fluorescent MOEs

One or more embodiments relate to the use of fluorescent MOFs to map the waterfront in highly permeable zones of a reservoir. MOFs used in such an application may have the same structure and composition as previously described. In such embodiments, MOFs may be used as tracers to provide information about inter-well connectivity. For example, injection fluid including fluorescent MOF tracers may be injected into a well. The fluorescent MOFs travel with the injection fluid through the formation. After a predetermined period of time, the fluorescent MOFs may be produced along with the produced fluid at a producing site. At the producing site, the MOFs' fluorescence in the produced fluid may be detected as described above and used to determine the water break-through time. The break-through time at different producing sites may be used to provide fluid flow information of the reservoir.

If no MOFs are detected at the surface via fluorescence, this indicates fractures and well-interconnectivity. The absence of MOFs indicates that the injection fluid is likely being lost to fractures in the reservoir. This method may provide essential information to manage production and avoid the loss of displaced oil from the mapped zone.

EXAMPLE

The following examples are provided to illustrate embodiments of the present disclosure. The examples are not intended to limit the scope of the present invention, and they should not be so interpreted.

Example 1

MOF 1

MOF 1 includes physically adsorbed carbon quantum dots as the fluorophore. Carbon quantum dots were synthesized as follows: 5 g sodium hydroxide, 100 mL acetone and 3 ml divinyl benzene are blended to yield an aldol reaction under vigorous stirring for 2 hours, and afterwards the product was put in ambient air, at room temperature, and under normal atmospheric pressure for 72 hours. Then, 1 M dilute HCl was used to adjust the pH to be neutral. The product was centrifuged and purified with deionized water numerous times, and the ultimate product was frozen at −70° C. for 24 hours to obtain CQD powder. The synthesis of MOF 1 was achieved via a one-step procedure as follows: 2-aminoterephthalic acid (1.44 g, 8.0 mmol), $Cr(NO_3)_3 \cdot 9H_2O$ (3.20 g, 8.0 mmol) and NaOH (0.80 g, 20 mmol) were dissolved in 60 mL deionized water under vigorous stirring for 30 minutes at room temperature. Then, different contents of CQDs were slowly dispersed, and the color of the mixture solution changed to light yellow. Subsequently, the resulting suspension was vigorously stirred for 30 minutes, then, the solution was transferred into a Teflon-lined autoclave and heated at 150° C. for 12 h under autogenous pressure, followed by cooling to room temperature. The obtained solid product (MOF 1) was isolated via centrifugation and washed three times with DMF, methanol and deionized water, respectively.

Drilling Fluid 1

An aqueous drilling fluid sample was prepared in a Hamilton beach multi-mixer. Unless otherwise specified, a mixing speed of 12,000 rpm (revolutions per minute) was used. Each sample was prepared by starting with water and then adding each of the components listed to provide a drilling fluid with the following composition. The prepared drilling fluid included 35 wt. % water, about 5 wt. % bentonite/clay, 0.3 wt. % starch/cellulose, 0.1 wt. % xanthan gum/guar gum, about 30 wt. % sodium chloride, 0.15 wt. % caustic soda, 1.5 wt. % marble medium, 26 wt. % barite, and 1.95 wt. % fluorescent MOF from Example 1.

Drilling Fluid 2

An oil-based drilling fluid sample was prepared in a Hamilton beach multi-mixer. Unless otherwise specified, a mixing speed of 12,000 rpm (revolutions per minute) was used. Each sample was prepared by starting with mineral oil and then adding each of the components listed to provide a drilling fluid with the following composition. The prepared drilling fluid included 68.6 wt. % mineral oil, 17 wt. % water, 5.7 wt. % calcium chloride, 1.7 wt. % lime, 1.7 wt. % surfactant, 0.8 wt. % clay, 2.55 wt. % calcium carbonate, and 1.95 wt. % fluorescent MOF from Example 1.

Embodiments of the present disclosure may provide at least one of the following advantages. The disclosed compositions and methods may allow for more precise depth determination of drill cuttings in real time during drilling operations as compared to conventional methods of analyzing drill cuttings. Analysis may be performed rapidly on-site, rather than transporting samples to a laboratory for analysis. Additionally, a complex identification matrix may be used for advanced systems. Furthermore, in some embodiments, the tags may be recycled using magnetic recovery of MOFs that include magnetic particles.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A composition of matter comprising:
a fluorescent metal-organic framework (MOF);
a protective material; and
a drilling fluid, wherein:
the MOF is configured to attach to formation cuttings; and
the protective material is selected from the group consisting of a porous silica, a porous ceramic and a polymer, wherein:
when the protective material is the porous silica or the porous ceramic, the MOF is entrapped inside pores of the porous silica or the porous ceramic; and
when the protective material is the polymer, the polymer is grafted over a surface of the MOF.

2. The composition of claim 1, wherein the fluorescent MOF comprises fluorescent building blocks.

3. The composition of claim 2, wherein the fluorescent building blocks are fluorescent organic linkers selected from the group consisting of 1,4-benzenedicarboxylic acid and its derivatives; 1,4- and 2,6-naphthalene dicarboxylic acids and its derivatives; biphenyl-4,4'-dicarboxylic acid and its derivatives; 2,7-pyrenedicarboxylic acid and its derivatives; 1,6-pyrenedicarboxylic acid and its derivative; 1,3,6,8-pyrenetetracarboxylic acid and its derivatives; pyrene-1-carboxylic acid and its derivatives; pyrene-2-carboxylic acid and its derivatives; 8-anilino-1-naphthalenesulfonic acid and its derivatives; 1,6-anthracene dicarboxylic acid and its derivatives; 1,1',4',1''-terphenyl-2',4,4'',5'-tetracarboxylic acid (TPTC), 1,1,2,2-tetrakis(4-(pyridine-4-yl)phenyl)ethane (TPPE), trans-4,4'-stilbene dicarboxylate, other organic linkers, and combinations thereof.

4. The composition of claim 2, wherein the fluorescent building blocks are fluorescent metal clusters selected from the group consisting of $Eu^{3+}$, $Sc^{3+}$, $Y^{3+}$, $Sm^{3+}$, $Pm^{3+}$, $Nd^{3+}$, $Pr^{3+}$, $Tm^{3+}$, $Er^{3+}$, $Dy^{3+}$, $Tb^{3+}$, $Zn^{2+}$, $Zr^{4+}$, $Co^{3+}$, $Ni^{2+}$, $Cr^{3+}$, $Nb^{5+}$, $Cu^{2+}$, $Cu^{1+}$, $Fe^{2+}$, $Fe^{3+}$, $Ti^{4+}$, $Al^{3+}$, $Am^{4+}$, $U^{4+}$, $Am^{3+}$, $Np^{4+}$, $Np^{3+}$, and combinations thereof.

5. The composition of claim 1, wherein the fluorescent MOF comprises non-fluorescent building blocks and a fluorescent moiety bonded to the MOF.

6. The composition of claim 5, wherein the fluorescent moiety is covalently bonded to the MOF.

7. The composition of claim 5, wherein the fluorescent moiety is selected from the group consisting of rhodamine dye and its derivatives, fluorescein and its derivatives, fluorescein isothiocyanate, uranin and its derivatives, eosin and its derivatives, BODIPY dyes and derivatives, porphyrin and its derivatives, phthalocyanine and its derivatives, and combinations thereof.

8. The composition of claim 1, wherein the MOF comprises a fluorophore intercalated into pores of the MOF.

9. The composition of claim 8, wherein the fluorophore is selected from the group consisting of metal ions, metal complexes, Rhodamine B, fluorescein, quantum dots, emissive beads, and combinations thereof.

10. The composition of claim 1, wherein the protective material is the porous silica or the porous ceramic.

11. The composition of claim 1, wherein the protective material is the polymer.

* * * * *